United States Patent [19]
Schoenwitz

[11] 3,824,550

[45] July 16, 1974

[54] READ-ONLY-MEMORY STORAGE APPARATUS FOR CONTROLLING DATA LOGGING APPARATUS

[75] Inventor: Frank H. W. Schoenwitz, Schaumburg, Ill.

[73] Assignee: Honeywell Inc., Minneapolis, Minn.

[22] Filed: June 7, 1973

[21] Appl. No.: 367,936

Related U.S. Application Data

[63] Continuation of Ser. No. 83,569, Oct. 23, 1970, abandoned.

[52] U.S. Cl. .................... 340/151, 340/163

[51] Int. Cl. .................... H04q 9/00

[58] Field of Search .......... 340/150, 151, 152, 163, 340/365 G, 171 R

[56] References Cited

UNITED STATES PATENTS

| | | | |
|---|---|---|---|
| 3,045,210 | 7/1962 | Langley | 340/150 R |
| 3,623,082 | 11/1971 | Stein | 340/365 S |

*Primary Examiner*—Harold I. Pitts

*Attorney, Agent, or Firm*—Lamont B. Koontz; Clyde C. Blinn

[57] ABSTRACT

A supervision system has a central station connected to a plurality of remote stations wherein information obtained from the remote stations is logged or printed out on a data logging apparatus or printer in accordance with a format previously established. The printer has a control apparatus which is connected to be controlled by a program stored in a read-only-memory storage apparatus for establishing a format for the collected data to be printed.

3 Claims, 6 Drawing Figures

PATENTED JUL 16 1974 3,824,550

SHEET 1 OF 4

INVENTOR.
FRANK H. W. SCHOENWITZ
BY
Clyde C. Blinn
ATTORNEY.

INVENTOR:
FRANK H. W. SCHOENWITZ
BY Clyde C. Blinn
ATTORNEY.

| | | | | | | | | | | | | |
|---|---|---|---|---|---|---|---|---|---|---|---|---|
| | 16 | | | SUB 9 | | 1 | | | | | POINT ADDRESS–TENS | 7 |
| | 17 | | | SUB 10 | | 1 | | 1 | | | POINT ADDRESS–UNITS | |
| | 18 | | | SUB 15 | | 1 | | | | | RED SHIFT | 8 |
| | 19 | | | SUB 9 | | 1 | | | | | SIGN | |
| | 20 | | | SUB 10 | | 1 | | | | | VALUE–HUNDREDS | |
| | 21 | | | SUB 15 | | 1 | | | | | VALUE–TENS | |
| | 22 | | | SUB 9 | | 1 | | | | | VALUE–UNITS | |
| | 23 | | | SUB 10 | 1 | | | | | | DECIMAL POINT | |
| | 24 | | | SUB 15 | | 1 | | | | | ENGINEERING UNIT 1 | |
| | 25 | | | SUB 9 | | 1 | | | | | ENGINEERING UNIT 2 | |
| | 26 | | | SUB 10 | | 1 | | | | | ENGINEERING UNIT 3 | |
| | 27 | | | SUB 15 | | | | | | | | |
| | 28 | | | SUB 9 | | 1 | | | | | BLACK SHIFT | |
| | 29 | | | SUB 15 | 1 | | | 1 | | | SPACE | |
| 65 | 30 | | | SUB 1 | | 1 | | | | | CHANNEL ADDRESS | 9 |
| | 31 | | | SUB 6 | 1 | | | | | | (DOT) ° | |
| | 32 | | | SUB 10 | | 1 | | | | | GROUP ADDRESS-TENS | |
| | 33 | | | SUB 17 | | 1 | | | | | GROUP ADDRESS-UNITS | |
| | 34 | | | SUB 8 | 1 | | | | | | (DOT) ° | |
| | 35 | | | SUB 6 | | 1 | | | | | POINT ADDRESS-TENS | |
| 71 | 36 | SUB 13 | | SUB 17 | | 1 | | 1 | | | POINT ADDRESS-UNITS | |
| | 37 | SUB 4 | | SUB 8 | 1 | | | | | | SPACE | 10 |
| | 38 | SUB 1 | | SUB 6 | | | | | | | SPACE | |
| | 39 | SUB 6 | | SUB 17 | 1 | | | | | | SPACE | |
| | 40 | SUB 10 | | SUB 8 | 1 | | | 1 | | | SPACE | |
| | 41 | SUB 5 | | SUB 6 | | 1 | | | | | SPACE | 13 |
| | 42 | SUB 6 | | SUB 17 | | | 1 | | | | JUMP TO ADDRESS 43 | 14 |
| 66 | 43 | SUB 7 | | SUB 8 | | | | | | 1 | NEW DATA | 15 |
| | 44 | SUB 8 | | SUB 6 | | | | | | 1 | NEW DATA | |
| | 45 | SUB 7 | | SUB 17 | | | | 1 | | 1 | NEW DATA | |
| | 46 | SUB 8 | | SUB 8 | | | | 1 | | 1 | NEW DATA | 17 |
| | 47 | SUB 7 | | SUB 6 | | | 1 | | | | JUMP TO ADDRESS 30 | 18 |
| | 48 | SUB 8 | | SUB 17 | | | | | | | | |
| | 49 | SUB 7 | | SUB 8 | | | | | | | | |
| | 50 | SUB 8 | | SUB 18 | | | | | | | | |
| | 51 | SUB 7 | | | | | | | | | | |
| | 52 | SUB 8 | | | | | | | | | | |
| | 53 | SUB 1 | | | | | | | | | | |
| | 54 | SUB 6 | | | | | | | | | | |
| | 55 | SUB 10 | | | | | | | | | | |
| | 56 | SUB 6 | | | | | | | | | | |
| | 57 | SUB 10 | | | | | | | | | | |
| | 58 | SUB 13 | | | | | | | | | | |
| | 59 | SUB 14 | | | | | | | | | | |
| | 60 | | | | | | | | | | | |
| | 61 | | | | | | | | | | | |
| | 62 | | | | | | | | | | | |
| | 63 | | | | | | | | | | | |

FIG. 2B

INVENTOR.
FRANK H. W. SCHOENWITZ
BY Clyde C. Blinn
ATTORNEY

FIG. 4 PRINTER OUTPUT FOR TREND LOGGING

FIG. 5 PRINTER OUTPUT FOR ALARM SUMMARY OF GROUP 1 CHANNEL 1

INVENTOR.
FRANK H. W. SCHOENWITZ
BY Clyde C. Blinn
ATTORNEY.

READ-ONLY-MEMORY STORAGE APPARATUS FOR CONTROLLING DATA LOGGING APPARATUS

This is a Continuation, of application Ser. No. 83,569, filed Oct. 23, 1970 and now abandoned.

BACKGROUND AND SUMMARY OF THE INVENTION

In supervision systems having central stations connected to a plurality of remote stations, data retrieved from the remote stations is logged or printed on a printer at the central station. Certain mechanical format control apparatuses have been used with printers and the format control of the printers has been commonly done by a stored program in core memory of computer apparatus associated with the central station. In mechanical controls, little flexibility is provided and the complexity of such mechanical equipment and the use of core memory in conjunction with software control makes such a format control apparatus relatively expensive.

The present invention makes use of a format control programming apparatus which does not require the use of complicated and expensive mechanical format control or the use of a central station apparatus having a core memory and software capability. Even if the central station has core memory the present invention does not require core memory for log format control to reduce the size of the core memory which might be used for other computer operations in the central station. Specifically, the present invention makes use of a read-only-memory storage apparatus apparatus in which a logging or printer control program is stored to control the data logging apparatus or printer in a manner to present the data collected from various stations in a format or prearranged presentation on the printer output or paper.

FIG. 1 of the drawing shows a schematic layout of the system having the central station connected to a plurality of remote stations with logging apparatus for logging data received in a manner as stored in the read-only-memory storage apparatus.

FIGS. 2A and 2B disclose programs and sub-programs which are stored in the read-only-memory storage apparatus for controlling the printer.

FIGS. 4 and 5 are two examples of printer output showing the trend logging and alarm summary logging as controlled by the control apparatus making use of the format stored in the read-only memory.

DESCRIPTION OF THE INVENTION

Figure 1:
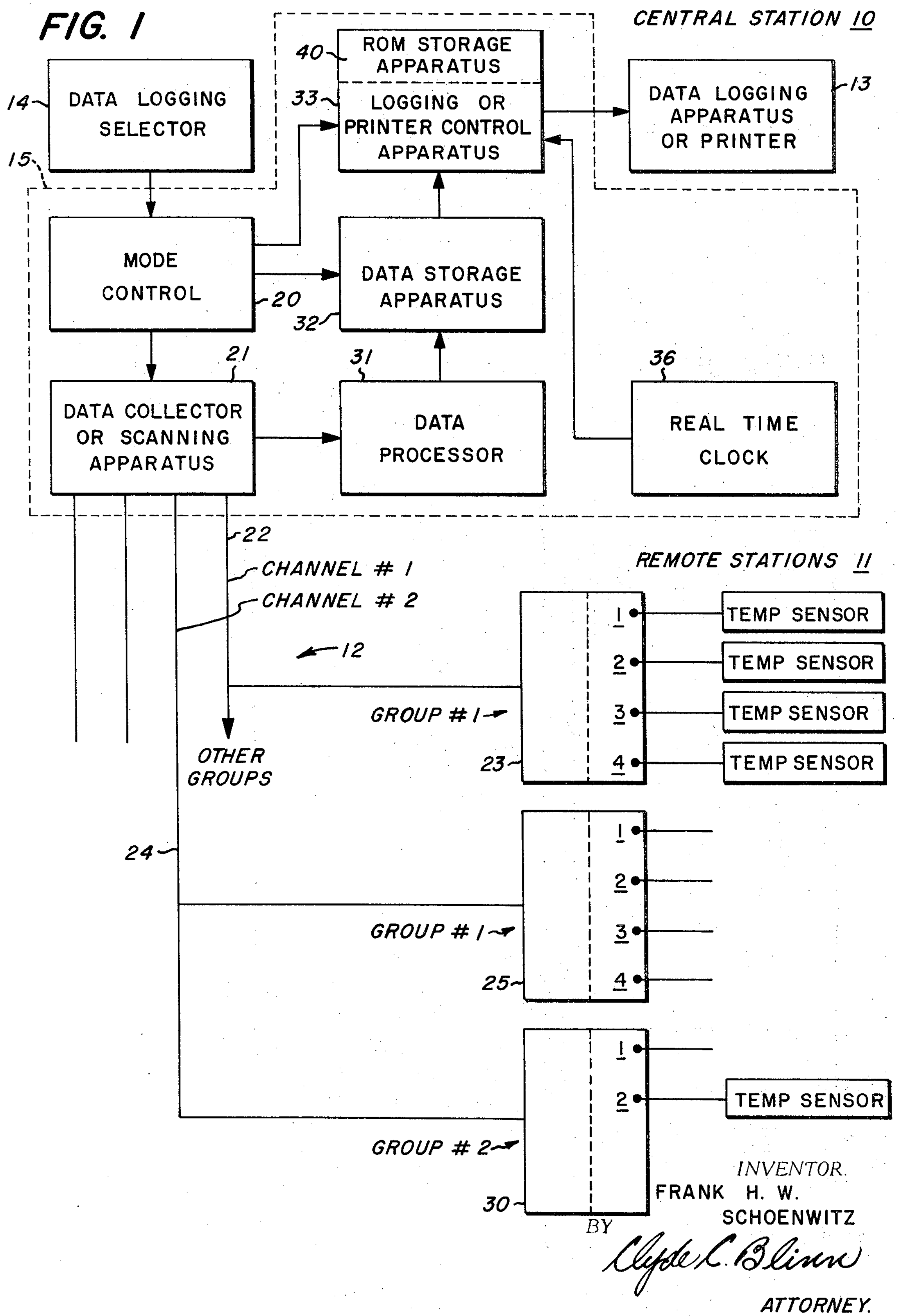

Referring to FIG. 1, a central station 10 is connected to a plurality of remote stations 11 by communication channels 12 whereby information or data retrieved from the remote stations can be logged or printed by the logging apparatus or printer 13 at the central station. When a data logging selector 14 which might be an automatic apparatus or a set of push buttons for a human operator, selects the data of various remote stations to be recorded by printing on paper by printer 13, a central processor 15 is placed in operation to present the data at the printer output in a particular prearranged manner.

Specifically selector 14 is connected to a mode control 20 which provides an output to a data collector apparatus 21 connected to the various remote stations over channels 12. The particular manner in which the data collector apparatus collects the data from the remote stations is no part of this invention, but for explanation purposes the remote stations are shown in groups connected to one of the transmission channels. Mode control apparatus 20 determines the type of data to be collected by the data collector apparatus 21 and a scanning operation is accomplished to retrieve the data for print-out on paper by printer 13.

Collector apparatus 21 has a channel 1 at 22 with a group 1 (at 23) of remote stations made up of stations 1, 2, 3 and 4 which are temperature sensors. Another transmission channel 2 at 24 is connected to groups 1 and 2 (at 25 and 30) of remote stations in which station 2 of group 2 is a temperature sensor. While remote stations are disclosed as temperature sensors, other types of remote stations could be used with the invention for printing the output of these stations by printer 13.

Data collected from the remote stations by data collector apparatus 21 is processed by a data processor 31 to transform the particular message type used to a useable form to be stored in a data storage apparatus 32. Mode control 20 has an output to both storage apparatus 32 and a logging or printer control apparatus 33. The printer control apparatus connected to receive an input from a data storage apparatus 32 and a real time clock 36.

Depending upon the type of data collected and the output of the mode control, printer control apparatus 33 selects from the read-only-memory storage apparatus 40 the particular program instructions for controlling printer 13 to print the data with a particular format.

Read-only-memory storage apparatus 40 is a 64 × 35 or 2,240 bit conventional metal oxide semiconductor memory which has an input address for particular programs which are obtained by stepping the memory from a first location through a sequence of steps to operate the printer through the control apparatus 33 in accordance with a main program and subprograms in another part of the memory. The particular read-only-memory storage apparatus 40 has been selected to contain the programs and sub-programs as shown in FIGS. 2A and 2B; however, other types and configurations of read-only-memories may be used.

Figure 2A:
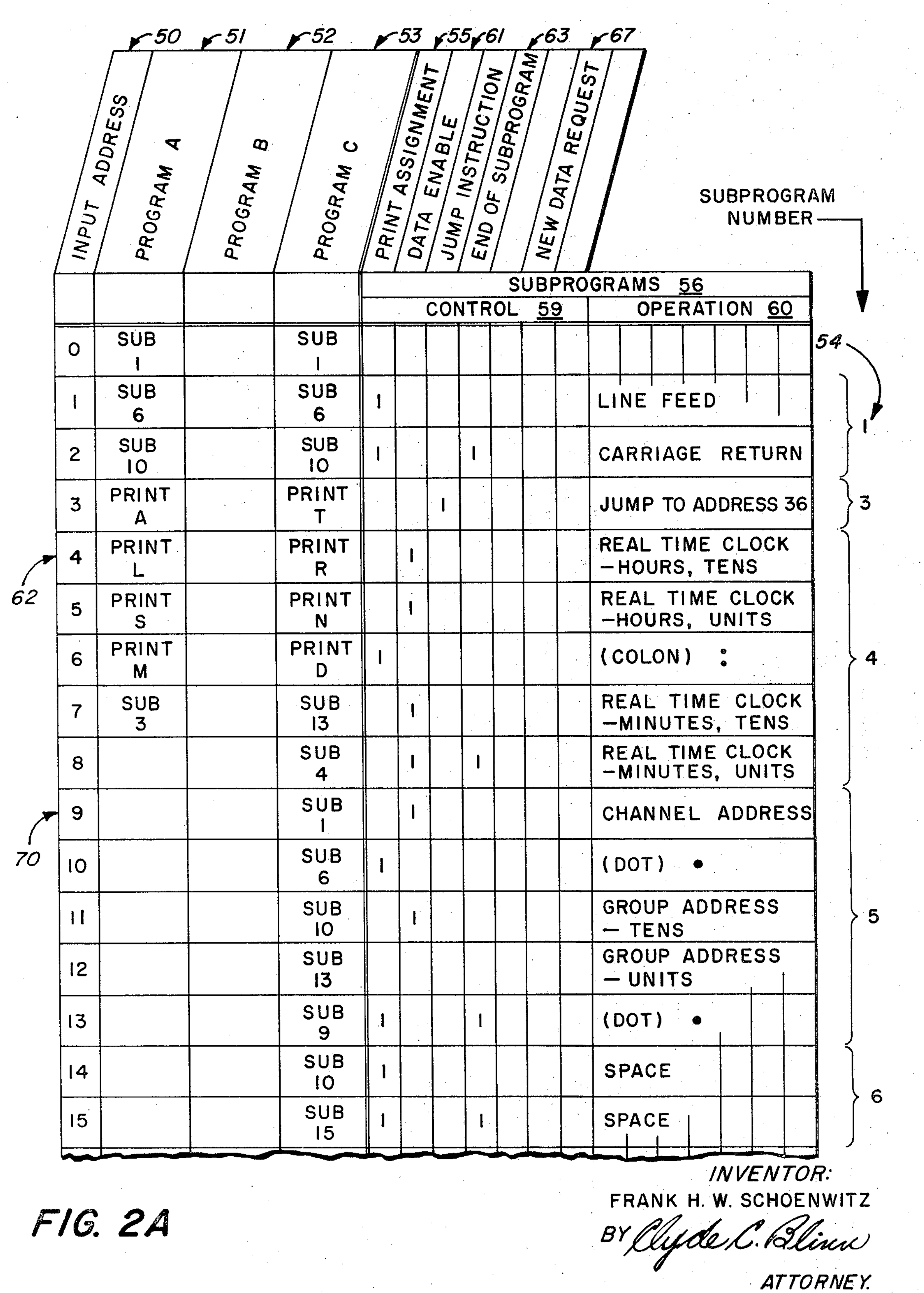
Figure 3:
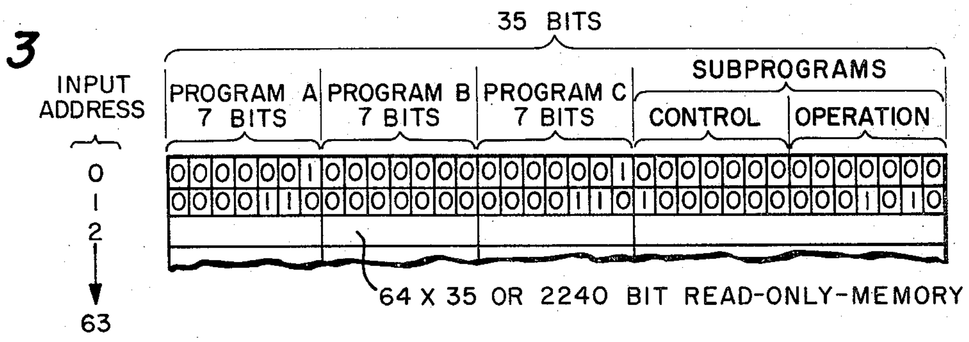
FIG. 3 is a detailed showing of one particular line of data stored in the read-only-memory.
Figure 3:
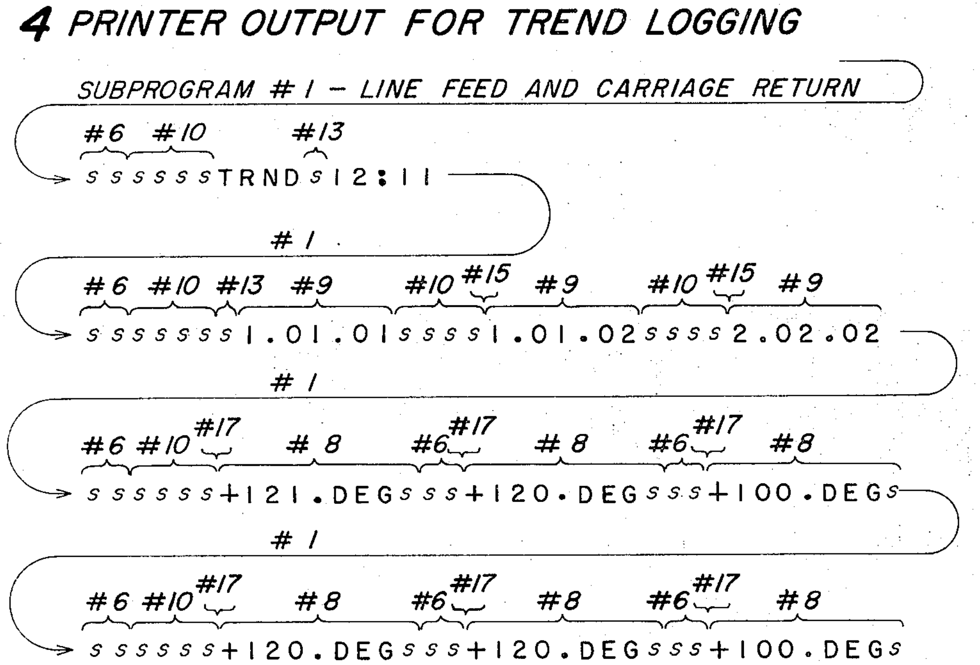
Figure 3:
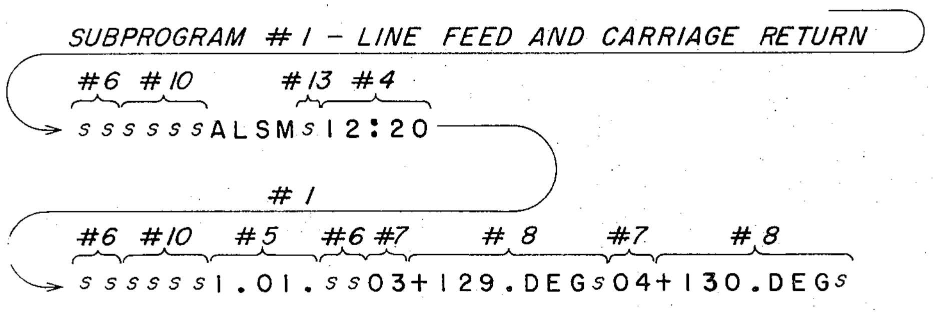

Referring to FIGS. 2A and 2B the table of input address from 0 to 63 with the various programs A, B and C and the various sub-programs are shown. The read-only-memory has a configuration as shown in FIG. 3, wherein the three columns of 7 bits and one column of 14 bits are shown for each of the 64 input addresses. With the particular input address 1 of program A, the address of the sub-program 6 is shown in binary form; however, for explanation purposes in FIGS. 2A and 2B the addresses are in written form and one skilled in the art could transform these written addresses to the binary addresses which are used by printer control apparatus 33 to control printer 13.

When the mode control 20 is actuated to bring about the collection of certain data and the printing of this data, printer control apparatus 33 refers to the proper program having certain sub-programs to control the printer format for logging or printing the data collected as obtained from the storage apparatus 32. Specifically, printer control apparatus 33 seeks out a particular main program by means of the input address 50 as shown in the first column of FIG. 2A to select a particular main program A, B or C at 51, 52 and 53. For example, if a main program as will be explained later for the "trend"-log operation is desired, the input address of 0 and program C is selected. Each line of a main program is made up of 7 bit instructions. Specifically the first bit of each line instructs the logging control apparatus to print the data stored in the remaining 6 bits or refers to a sub-program addressed with the remaining 6 bits. The program C at 53 starts with the first sub-program 1 which is shown at 54. After finishing with the sub-program at 54 by moving down the memory one step at a time under the control of printer control apparatus 33, the next step of the main program at 53 is used which in this particular case is sub-program 6. Control apparatus 33 makes use of the sub-program control bits at 59 in the sub-program to control the printer.

The first column at 55 of the sub-program control portion of the sub-programs is a print assignment bit which enables the printer to do the sub-program operations shown at 60. For example, for the first line of sub-program 1, the print assignment or control operation of the printer is a line feed and the second operation of sub-program 1 is a carriage return.

The second column 61 of the control portion of the sub-program is concerned with data enable wherein the printer control apparatus 33 enables the data from the remote stations as collected in the storage apparatus 32 or any other data source to be printed by the printer. For example at line 62 of the sub-program, the data enable bit causes printer control apparatus 33 to print the output of real time clock 36 in tens of hours which is the beginning of sub-program 4. Upon stepping to the next step of sub-program 4, real time clock is connected to print the units of hours. Upon reaching the third step of sub-program 4 the print assignment at 55 causes the printer to print a colon which is stored in the sub-program operation portion 60 of the read-only-memory.

Each sub-program continues through its operation step-by-step until it reaches the end of sub-program bit shown in the column at 63. Control apparatus 33 then returns to the main program at 53.

The new data request at 67 is a sub-program control bit for the printer control apparatus 33 to skip the point out of the next data stored in data storage apparatus 32 or any other data source.

OPERATION OF THE INVENTION

The operation of the invention is described using two particular formats which may be used by printer 13. While these two are described, many other formats may be provided by storing the proper operation program in the read-only-memory storage apparatus. The various columns previously described in FIGS. 2A and 2B only show the programs including the sub-programs for the particular disclosed examples.

In a supervision operation the trend of the change in a condition at a remote station is sometimes desired. Upon scanning the remote station and printing out the condition such as the temperature every so many minutes, the human operator can look at the printer output and determine if the temperature is changing in one direction or the other and at what rate. In the example of printer output or sheet of paper as shown in FIG. 4 a trend logging was selected by data logging selector 14 for the remote stations 1 and 2 of group 1 on channel 1 and station 2 of group 2 of channel 2, their respective addresses being 1.01.01, 1.01.02, and 2.02.02 (channel, group and point). Such a selection can be made either automatically or by means of a manual key board on selector 14. The data collector apparatus 21 then scans the various remote stations and brings into data storage apparatus 32 the temperatures of the temperature sensors of these remote stations. Simultaneously, the mode control 20 causes printer control apparatus 33 to refer to the read-only-memory storage apparatus 40 for the particular program to control the printer for setting forth the data as it is collected in a format as shown in FIG. 4.

For the particular trend logging, the input address to the read-only-memory storage 40 is 0 and program C which starts with the first step at 53 of FIG. 2A. Printer control apparatus 33 steps down the particular program at 53 making use of the sub-programs which are referred to accomplish a particular format control. The channel addresses as shown in FIG. 4 with the temperature of those particular stations for every so often, such as every 5 minutes, is shown below the channel addresses so that columns of data provides a showing a trend in the change of the temperature.

Referring to the program C at 53 in FIG. *2a,* the first operation is the sub-program 1 which is shown at the first line in the sub-programs to be a line feed for the carriage. The second operation for control apparatus 33 is to step to the next line of sub-routine 1 which is the carriage return. Thus as shown in FIG. 4 the sub-program 1 is a line feed and carriage return to position the carriage of the printer at the left side for the first line. As this is the end of sub-program 1, control apparatus 33 then steps to the next line of the main program at 53 which is sub-program 6 which has an operation of two spaces. After sub-program 6 is finished, the next step of the main program is sub-program 10 which is four spaces. After sub-program 10, the next step as well as the next four steps is a print operation wherein the data stored in the main program is pointed to result in the letters TRND. After the last print operation, the next step in the main program is sub-program 13 which is a space.

Sub-program 4 is a time print out and as shown in the first step of sub-program 4 at 62, real time clock 36 is connected to the printer to print the hours in tens, the hours in units, a colon, the minutes in tens and the minutes in units to end sub-program 4. Again sub-program 1 is referred to for a line feed and carriage return to start the second line of the print output as shown in FIG. 4.

Referring to sub-program 9 which is used after sub-programs 6, 10 and 13 to obtain the spaces of the second line in FIG. 4, a print out of the channel, group and point address is provided. Referring to sub-program 9 as shown at 65, mode control 20 has informed control apparatus 33 of the various channels which are to be printed out in the trend format. The first of these channels is then printed out by sub-routine 9 which has the various steps to show the channel address as channel 1, a dot, the group address in tens and units, a dot, and the point address in tens and units which is the end of sub-program 9. After the four spaces of sub-program 10, the next sub-program of the main program is sub-program 15 at 66 which is concerned with skipping the data or the temperature associated with station 1 of the group 1 an channel 1 previously printed out. Since this sub-program has a "new data request" instruction bit at 67, the printer does not print out the sign, temperature, and engineering units of that station. Again sub-program 9 is used to print out the next station address. When all of the stations to be reported as set by the mode control 20 previously selected by data logging selector 14 have been printed out, not in excess of six, (as limited by the main program) sub-program 1 is again referred to as shown at 65 of the program of 53 to provide the line feed and carriage return to start line 3 as shown in FIG. 4.

After sub-program 6 and 10 have been used to provide the six spaces, sub-program 17 concerned with skipping the channel address. Sub-program 8 provides for the printing in red if the point is in alarm to accomplish a red shift, the sign (+ or −), value in hundreds, value in tens, value in units, a decimal point and the engineering units (DEG). After the print-out of the stations requested, not exceeding 6 (as limited by the main program) this operation is repeated for each subsequent line until a stop command is initiated by the operator at selector 14.

Specifically the last entry in the program at 53 is an instruction. Referring to sub-program 18 which in turn instructs printer control apparatus 33 to return to the main program at line 65 to print all subsequent lines of the trend log as shown in FIG. 4. From the printed output as shown in FIG. 4, the human operator can observe that the temperature of station 1 of channel 1 in group 1 has decreased from 121°F to 120°F during the period between the trend printing.

Another example of a printer output is shown in FIG. 5 for an alarm summary. By means of data logging selector 14, a selection of the print-out of all points which are in alarm; that is, above or below some set limits, is accomplished. Mode selector 20 causes the data collecting apparatus 21 to collect the data and store in storage apparatus 32 all points which are in alarm. For example, the human operator may select to print-out all stations in alarm in Group 1 of channel 1. Thereafter, the station address and the temperature of the stations in alarm ar stored in storage apparatus 32.

Printer control apparatus 33 refers to the read-only-memory storage apparatus 40 at the address 0 and program A as shown at 51 of FIG. 2*a* to begin the program and accomplish each sub-program by stepping from one line to the next in the main program to print-out the stations in alarm from storage 32. As was explained with the previous trend program, the first three steps for sub-program 1, 6 and 10 are for the line feed and carriage return with the two sets of spaces. The next four steps are for the print-out of the letters ALMS. After the space, sub-program 3 is an instruction to jump to line 71 in the main program A which has a first entry of sub-program 13. Sub-program 13 is a space and sub-program 4 is the time as accomplished from real time clock 35. Thereafter, with the line feed and carriage return and several spaces, the first channel and group address is provided by sub-program 5 as shown at 65 which upon referring to the sub-program starting at line 70, the channel address, a dot, the group address in tens and units and a dot is provided. Thereafter for each point of that group which is in alarm, the value with the engineering units is provided after each point address by the main program at 51 until all the alarm data contained in data storage apparatus 32 is printed (only two alarm points, stations 3 and 4 are printed in the example in FIG. 5).

With such a read-only-memory storage apparatus 40, any printer format can be generated by substituting a new memory to provide a printer format control in an inexpensive and flexible manner.

The embodiments of the invention in which an exclusive property or right is claimed are defined as follows:

1. In a supervision system having a central station connected to a plurality of groups of remote stations wherein information data obtained from the remote stations by the central station is logged by logging apparatus controlled by a control means having a memory apparatus for determining the format used by the logging apparatus to log the information data, the improvement comprising:

said memory apparatus being a predetermined semiconductor read-only-memory for insertion into the control means wherein operation steps for said control means for controlling the logging apparatus are stored to be sequentially used by said control means by providing a plurality of bits for use with electrical control apparatus connected to the logging apparatus to present the information data with a predetermined format.

2. In a data logging apparatus having a data logging format control means, the improvement comprising the use of a single semiconductor read-only-memory having a plurality of bits with electrical control apparatus for stepping through said memory to use said bits to control an operation of the data logging apparatus to present logged data in a format selected by a predetermined format determined by said single read-only-memory.

3. In a data logging apparatus for recording in a selected format the data collected from a plurality of data retrieval points, said apparatus comprising:

data collecting apparatus for collecting data at a central location from a plurality of points over electrical circuits, logging apparatus at the central location for logging the data collected over said electrical circuits from said plurality of points, a single semiconductor read-only-memory storage apparatus having a plurality of storage steps each with a plurality of bits, and electrical control means connected to said storage apparatus, said logging apparatus and said data collecting apparatus for selecting a format from said read-only-memory storage apparatus by stepping down said memory through said plurality of storage steps to use the bits for controlling the format to be used by said logging apparatus and for selecting from said data collecting apparatus the type of data to be logged by said logging apparatus.

* * * * *